(12) United States Patent
Franklin et al.

(10) Patent No.: US 8,155,040 B2
(45) Date of Patent: Apr. 10, 2012

(54) USER EQUIPMENT CAPABILITY BIASING

(75) Inventors: Steven Franklin, Guildford (GB);
Leonardo Provvedi, Eastleigh (GB);
Timothy Norris, Winchester (GB);
Martin Robinson, Hook (GB); Simone Provvedi, Middlesex (GB)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 12/558,522

(22) Filed: Sep. 12, 2009

(65) Prior Publication Data

US 2011/0122801 A1    May 26, 2011

Related U.S. Application Data

(60) Provisional application No. 61/191,894, filed on Sep. 12, 2008.

(51) Int. Cl.
*H04B 7/00* (2006.01)
(52) U.S. Cl. ......... 370/310; 370/276; 370/280; 370/281
(58) Field of Classification Search .......... 370/235, 370/236, 252, 276, 277, 280, 281, 295, 294, 370/310, 314, 331, 343, 442; 455/7, 67.11, 455/410, 414.1, 419, 422.1, 426.1, 425, 436, 455/450, 452.1, 456.1, 456.2, 552.1, 509, 455/517
See application file for complete search history.

(56) References Cited

U.S. PATENT DOCUMENTS

| | | | |
|---|---|---|---|
| 6,600,917 B1* | 7/2003 | Maupin ....................... | 455/414.1 |
| 2002/0071480 A1* | 6/2002 | Marjelund et al. ............. | 375/141 |
| 2004/0009770 A1* | 1/2004 | Sivanandan et al. .......... | 455/425 |
| 2004/0106430 A1* | 6/2004 | Schwarz et al. ........... | 455/552.1 |
| 2005/0136898 A1* | 6/2005 | Shaheen et al. ............. | 455/414.1 |
| 2005/0266853 A1* | 12/2005 | Gallagher et al. ........... | 455/439 |
| 2006/0160551 A1* | 7/2006 | Matoba et al. ................ | 455/509 |
| 2007/0019575 A1* | 1/2007 | Shaheen ....................... | 370/310 |
| 2007/0165573 A1* | 7/2007 | Hietalahti ..................... | 370/331 |
| 2007/0173283 A1* | 7/2007 | Livet et al. ................. | 455/552.1 |
| 2008/0009312 A1* | 1/2008 | Rooyen ..................... | 455/552.1 |
| 2008/0039094 A1* | 2/2008 | Jeong et al. .................... | 455/436 |
| 2009/0011783 A1* | 1/2009 | Kitazoe .......................... | 455/517 |
| 2009/0075657 A1* | 3/2009 | Klatt ............................. | 455/436 |
| 2009/0147763 A1* | 6/2009 | Desai et al. .................... | 370/343 |
| 2009/0170426 A1* | 7/2009 | Jung et al. .......................... | 455/7 |
| 2009/0238143 A1* | 9/2009 | Mukherjee et al. ........... | 370/331 |
| 2010/0093340 A1* | 4/2010 | Buracchini ................ | 455/426.1 |
| 2010/0135215 A1* | 6/2010 | Tang et al. .................... | 370/328 |

(Continued)

FOREIGN PATENT DOCUMENTS

WO    9826625 A2    6/1998

OTHER PUBLICATIONS

3GPP Draft; R2-081190, "Consultation Mechanism for Inter-RAT UE Capabilities", Feb. 11-15, 2008, 4 pages.

(Continued)

*Primary Examiner* — Aung S Moe
*Assistant Examiner* — Abdullah Riyami (57) ABSTRACT

In accordance with the exemplary embodiments of the invention there is at least a method, apparatus, and executable computer program to perform operations including receiving at a user equipment information from a network access node, prioritizing capability information of the user equipment in accordance with the received information, and transmitting all or at least part of the prioritized capability information to the network access node.

10 Claims, 6 Drawing Sheets

U.S. PATENT DOCUMENTS

2010/0151869 A1* 6/2010 Fischer et al. ............... 455/450
2010/0234029 A1* 9/2010 Ishii et al. ................... 455/437
2010/0330959 A1* 12/2010 Mildh et al. ................. 455/410
2011/0082937 A1* 4/2011 Barbaresi et al. ............ 709/226
2011/0176424 A1* 7/2011 Yang et al. ................ 370/236.2

OTHER PUBLICATIONS

International Search Report and Written Opinion, Received in corresponding International Patent Application No. PCT/IB2009/006814, mailed Dec. 30, 2009, 14 pages.

* cited by examiner

USER EQUIPMENT CAPABILITY BIASING

CROSS-REFERENCE TO RELATED APPLICATIONS

This patent application claims priority under 35 U.S.C. §119(e) from Provisional Patent Application No. 61/191,894, filed Sep. 12, 2008, the disclosure of which is incorporated by reference herein in its entirety.

TECHNICAL FIELD

The exemplary and non-limiting embodiments of this invention relate generally to wireless communication systems, methods, devices and computer programs and, more specifically, relate to techniques to inform a network access node of a wireless communication system of operational capabilities of a user equipment.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section. Various abbreviations that appear in the specification and/or in the drawing figures are defined as follows:

2G 2nd generation mobile communication system, for example GSM
3G 3rd generation mobile communication system, for example WCDMA
CDMA code division multiple access
CN core network
DL downlink
EDGE enhanced data rates for GSM evolution
E-UTRAN evolved universal terrestrial radio access network
FDD frequency division duplex
GERAN GSM/EDGE radio access network
GPRS general packet radio services
GSM global system for mobile communications
HO handover
LTE long term evolution
NodeB base station
eNB evolved NodeB
MS mobile station
MME mobility management entity
NW network
RAT radio access technology (e.g., GERAN, CDMA, UTRAN, E-UTRAN)
RRC radio resource control
S-GW serving gateway
SI system information
TDD time division duplex
UE user equipment
UL uplink
UMTS universal mobile telecommunications system
UTRAN universal terrestrial radio access network
WCDMA wideband code division multiple access
WiMAX worldwide interoperability for microwave access (IEEE 802.16 standard)
WLAN wireless local area network Within radio protocols, such as cellular radio protocols, there are various situations where the UE indicates its capabilities to the network. The network then uses this information to make decisions, for example how to configure the UE, or how to move the UE in a mobile environment.

There is often a need to minimize the amount of information that is sent from the UE to reduce message lengths and bandwidth consumption. This sometimes means that the amount of information that can be provided by the UE is limited and, as a result, the network may not be able to make the correct decision due to a lack of complete information. This can lead to failed procedures as the network commands the UE to perform actions it cannot complete (for example, redirect to a technology/frequency band the UE does not support), or not perform actions that it could complete (for example, perform handover to a band/RAT the UE does support but has not indicated to the network).

SUMMARY

In an exemplary aspect of the invention, there is a method comprising receiving at a user equipment information from a network access node, prioritizing capability information of the user equipment in accordance with the received information, and transmitting all or at least part of the prioritized capability information to the network access node.

In another exemplary embodiment of the invention, there is a computer readable medium encoded with a computer program executable by a processor to perform actions comprising receiving at a user equipment information from a network access node, prioritizing capability information of the user equipment in accordance with the received information, and transmitting all or at least part of the prioritized capability information to the network access node.

In yet another exemplary embodiment of the invention, there is an apparatus comprising at least one processor and at least one memory including computer program code, the at least one memory and the computer program code are configured, with the at least one processor, to cause the apparatus, in response to receiving information from a network access node, to at least prioritize capability information of the apparatus in accordance with the received information, and transmit all or at least a part of the prioritized capability information to the network access node.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

The foregoing and other problems are overcome in accordance with the exemplary embodiments of this invention by providing the UE with an ability to prioritize the capabilities indicated to the network based on the presence of other information provided by the network in the DL. For example, the UE may use neighbor cell information provided by the network to prioritize mobility indications sent in the uplink. This enables the UE to prioritize information related to mobility to known neighbor cells (including differing RATs) over other supported capabilities.

It may be anticipated that future mobile devices (which may be collectively referred to as MSs and/or UEs or simply as UEs) will support several RATs (e.g. 2G/3G/LTE and beyond). As used herein, the term RAT refers to a radio access technology for a wireless communication system. A RAT may be utilized in conjunction with a cellular system or a non-cellular system. A mobile device that supports more than one, such as at least two or three different RATS, may be referred to herein as a "multi-RAT" mobile device (or MS, or UE).

As employed herein an UTRAN-LTE (EUTRAN) RAT may be specified generally with regard to 3GPP TS 36.300, V8.5.0 (2008-05), 3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 8), and more specifically with the group of standards 3GPP TS 36.xxx.

A 2G RAT may be compatible with, as non-limiting examples, GPRS/EDGE or GSM, while a 3G RAT may be one compatible with, as non-limiting examples, UMTS, WCDMA and cdma2000.

A specification of particular interest herein with regard to UTRAN is 3GPP TS 25.331 V8.3.1 (2008-08), Technical Specification 3rd Generation Partnership Project; Technical Specification Group Radio Access Network; Radio Resource Control (RRC); Protocol Specification (Release 8), in particular sections 8.1.6 Transmission of UE capability information, 8.1.3.9 Reception of an RRC CONNECTION REJECT message by the UE, and 8.1.3 RRC connection establishment and 8.3.6 Inter-RAT handover to UTRAN.

Figure 4:
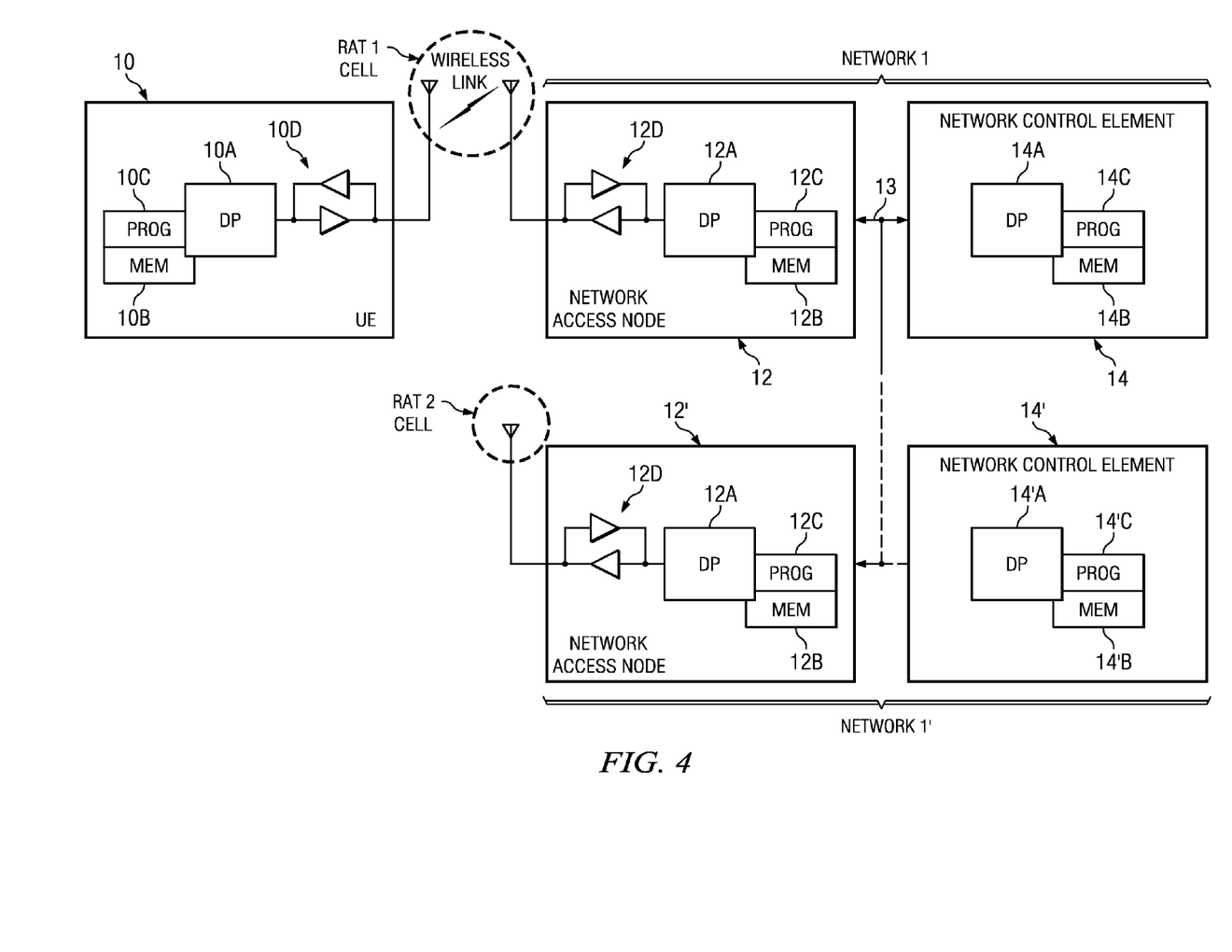
FIG. 4 is a simplified block diagram of various electronic devices comprising apparatus suitable for implementing the exemplary embodiments of this invention.

Reference is made first to FIG. 4 for illustrating a simplified block diagram of various electronic devices that are suitable for use in practicing the exemplary embodiments of this invention. In FIG. 4 a wireless network (NW) 1 is configured for communication with a UE 10 via a network access node 12 (e.g. NodeB, BSC or, eNB). The NW 1 may include a network control element (NCE) 14 (e.g. eNB in E-UTRAN, as shown in FIG. 4 of 3GPP TS 36.300, RNC in UMTS and BSC in GSM). It can be noted that the network access node and the NCE may be within the same entity (e.g. eNB in E-UTRAN).

The UE 10 includes at least one control unit such as a data processor (DP) 10A, a computer-readable memory medium or memory (MEM) 10B that stores a program of computer instructions (PROG) 10C, and at least one suitable wireless, e.g., radio frequency (RF) transceiver 10D for bidirectional wireless communications with the network access node 12. The network access node 12 also includes at least one control unit, such as a DP 12A, a computer-readable memory medium or memory (MEM) 12B that stores a program of computer instructions (PROG) 12C, and a suitable RF transceiver 12D. The network access node 12 is coupled via a data path 13 to the NCE 14 that also includes a DP 14A and a MEM 14B storing an associated PROG 14C. At least one of the PROGs 10C, 12C and 14C is assumed to include program instructions that, when executed by the associated DP, enable the electronic device to operate in accordance with the exemplary embodiments of this invention, as will be discussed below in greater detail.

Also shown is a second network access node 12', which may also be a NodeB, and which may be a neighbor BS. The neighbor BS may be of a different RAT type, e.g., a BS associated with a 2G, 3G, WiMAX RAT, as non-limiting examples. The cell of the network access node 12 (which may be a currently serving cell of the UE 10) may or may not be a neighbor cell to the cell of the network access node 12'. Further, while only one network access node 12' is shown, typically there will be several that qualify at any given time as neighbor network access nodes. The network access node 12' also includes a DP 12A, MEM 12B, PROG 12C and wireless transceiver 12D. Note that while the network access node 12' may operate in accordance with a different RAT than the network access node 12, it may also be connected to the same CN as the network access node 12, or it may be connected to a different CN.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The exemplary embodiments of this invention may be implemented by computer software executable by the DP 10A of the UE 10, the DP 12A of the network access node 12 and the other DPs, or by hardware, or by a combination of software and hardware.

The MEMs 10B, 12B and 14B may be of any type suitable to the local technical environment and may be implemented using any suitable data storage technology, such as semiconductor-based memory devices, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on a multicore processor architecture, as non-limiting examples.

Discussed now in further detail are the exemplary embodiments of this invention. Several examples are provided to illustrate the utility of these exemplary embodiments.

EXAMPLE 1

Inter-RAT Redirection

For interworking between different UTRAN bands and RATs, it is useful for the NW 1 to have the possibility to redirect a call to a different frequency band or RAT upon call establishment (i.e., before resources are allocated for the call in the network). For example, in the case of the UE 10 being camped on a UTRA cell while in idle mode, the NW 1 may want to redirect the UE 10 to E-UTRAN at call setup if the user requests a connection for data transfer, while requests for connections for voice calls may be best served in the UTRAN.

A mechanism for redirection at call setup already exists in the 3GPP specifications, and involves the NW 1 responding to a connection request from the UE 10 with a connection reject message that includes redirection information. The UE 10 then acts on this information by sending a new connection request on the new frequency band or RAT indicated by the NW 1. The NW 1 has the option to specify a specific cell that the UE 10 should move to and from which the new connection request should originate.

For a UE 10 camping on a UTRAN cell, using the mechanism above to redirect the UE 10 to a frequency band (within, e.g., UTRAN) or RAT (e.g., E-UTRAN) by including redirection information in the RRC CONNECTION REJECT message may cause a problem, as the UE 10 capabilities (including information about support of E-UTRAN or different UTRAN frequency bands) are not indicated in the RRC CONNECTION REQUEST message. Instead, they are only contained in the RRC CONNECTION SETUP COMPLETE message which is sent by the UE 10 to the NW 1 when a connection has already been established. Hence the NW 1 has no information about whether the UE supports E-UTRAN or UTRAN frequency bands, and thus may attempt to redirect to a frequency or RAT (e.g., E-UTRAN) for which the UE 10 has no such capability. This situation would result in a failed redirection, and an increased number of such failed redirections can result in a decrease in NW 1 capacity and an increase in connection establishment time.

It has been considered that flags could be added to the RRC CONNECTION REQUEST message, indicating UTRAN multi-band and E-UTRAN support. However, without the network NW 1 having information about the supported bands a successful redirection cannot be guaranteed, as the UE 10 could be redirected to a frequency (e.g., UTRAN or E-UTRAN) belonging to an unsupported band.

In order to address these problems, the exemplary embodiments of this invention provide a technique whereby the UE 10 operates as follows: the UE 10 sets a flag to indicate to the NW RAT or Band support only if:
measurement control information in the system information received from network access node 12 contains frequencies belonging to the bands that the UE 10 supports; and
the UE 10 supports the mode (FDD or TDD) that the frequencies in those bands are used for.

This mechanism applies not only to redirection to E-UTRAN and UTRAN frequencies, but also to redirection to any other RAT (including GSM, CDMA2000) or access mode (UTRAN TDD and E-UTRAN TDD).

Figure 1:
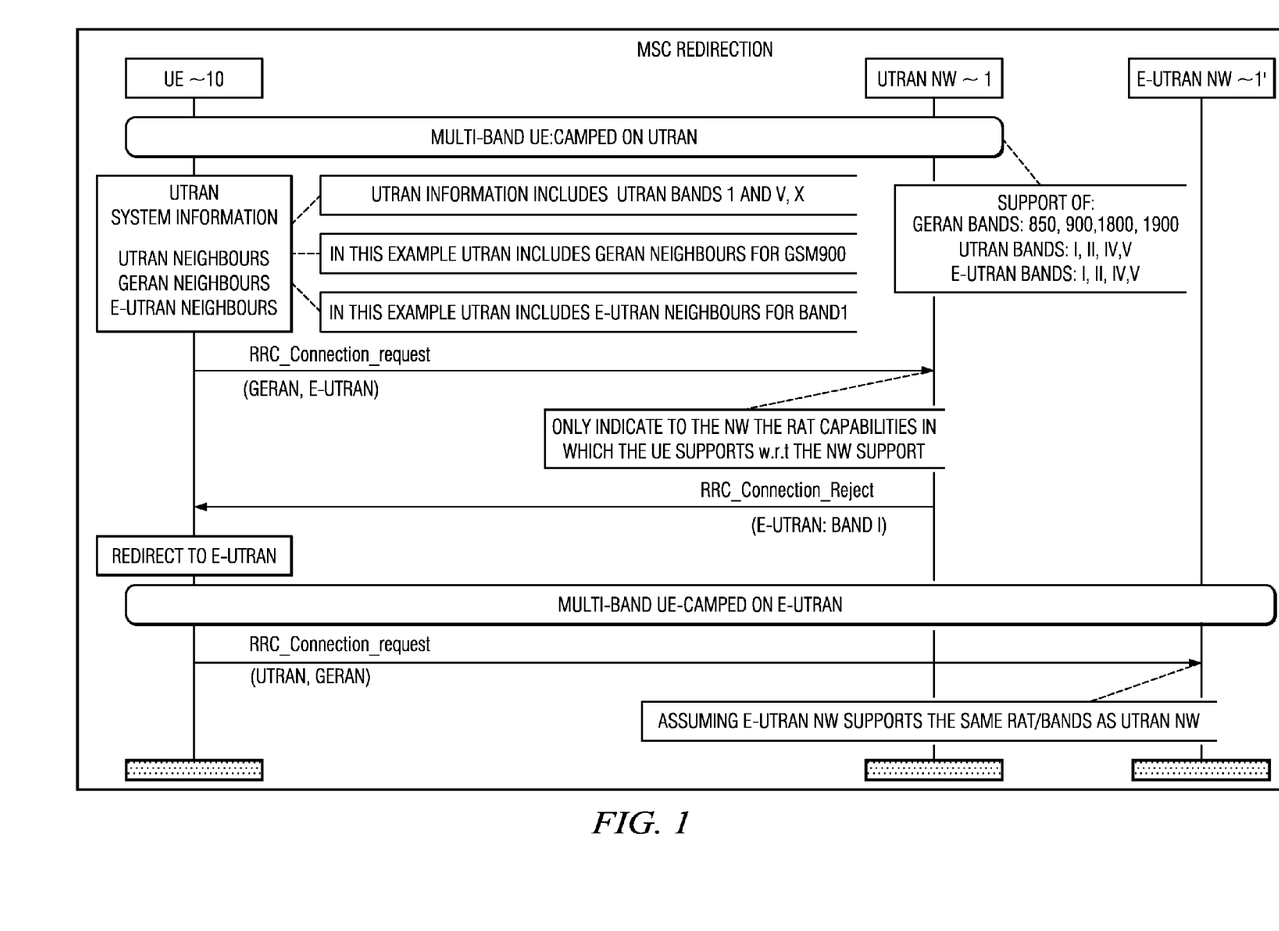
FIG. 1 is a message flow diagram that is useful for explaining a redirection to E-UTRAN (RAT Capability Indication) example in accordance with the exemplary embodiments of this invention.

FIG. 1 illustrates an exemplary case of redirection at call set-up from UTRAN to
E-UTRAN. In this example assume the case of a UTRAN NW 1 and an E-UTRAN NW 1', and further assume that the UE 10 is a multi-band UE that supports GERAN bands 850 MHz, 900 MHz, 1800 MHZ and 1900 MHz, UTRAN bands I, II, IV and V, and E-UTRAN bands I, II, IV and V. The received UTRAN system information (SI, measurement control information) includes UTRAN bands I, V and X. It is further assumed that inter-RAT information is sent on the current access technology, and UTRAN system information includes GERAN neighbors for GSM900 and E-UTRAN neighbors for Band I. In this example the UE 10 sends a RRC_CONNECTION_REQUEST (GERAN, E-UTRAN) to the UTRAN NW 1, and this message only indicates to the NW 1 those RAT capabilities that the UE 10 supports with respect to NW 1 (GERAN, E-UTRAN). In response the NW 1 sends a RRC_CONNECTION_REJECT message that indicates E-UTRAN Band I. In response the UE 10 is redirected to the E-UTRAN NW 1' and sends another RRC_CONNECTION_REQUEST message to the E-UTRAN NW 1'.

Note that in FIG. 1 a check is made against NW 1 support of certain RATs, and this procedure thus operates in accordance with the exemplary embodiments of this invention.

However, the foregoing procedure does not guarantee that the redirection will be successful, as the UE 10 may only support a subset of the bands; for example the measurement control information in UTRAN may contain frequencies from E-UTRAN band I and band II, but the UE 10 only supports band I. If the UE 10 simply sets the flag, the NW 1 may redirect the UE 10 to a frequency on band II, which would result in a failure. Hence, this approach does not guarantee that the UE 10 will not be redirected to a band that it does not support. In this instance the NW 1 may then redirect the UE 10 to the correct, supported band upon a re-attempt made after a wait time expiry.

Figure 2:
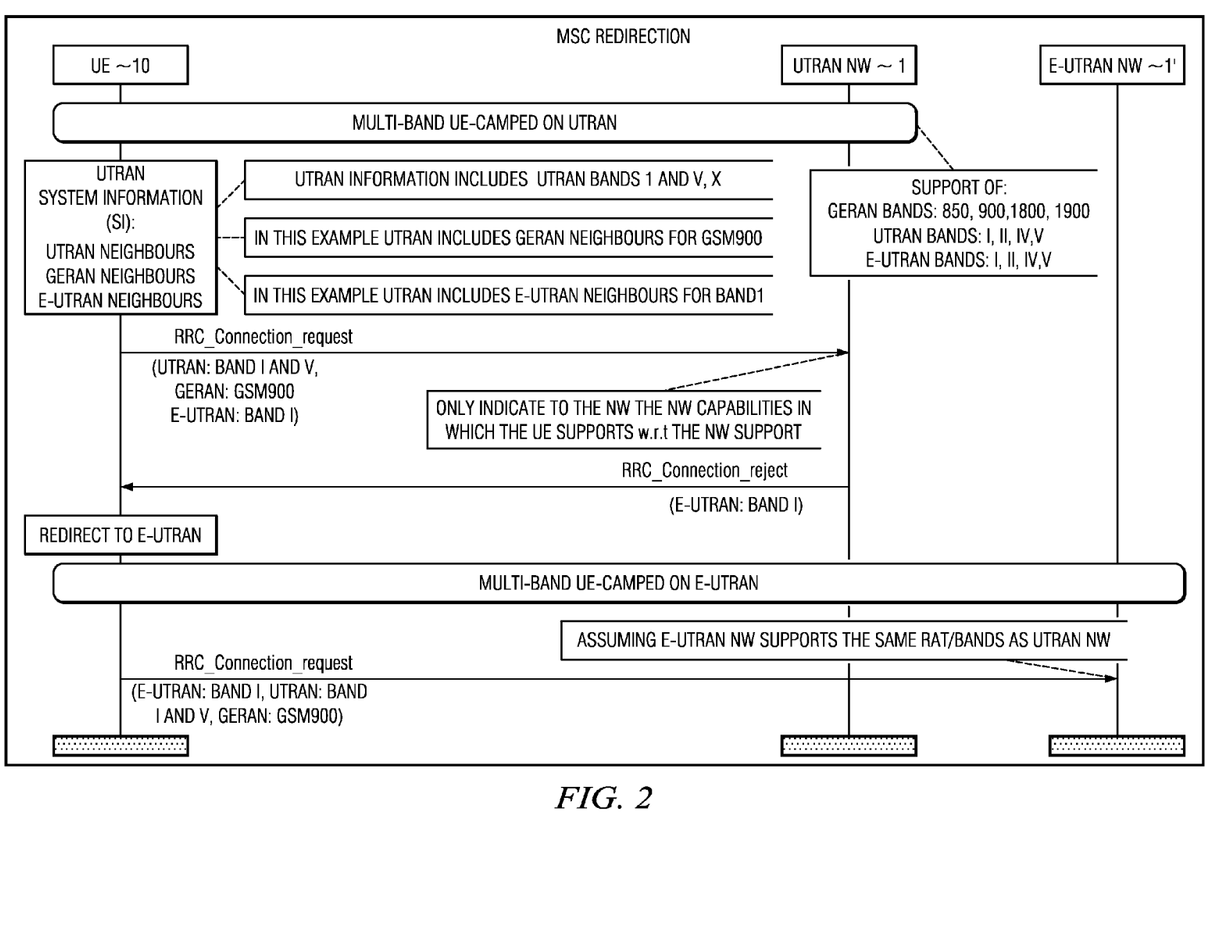
FIG. 2 is a message flow diagram that is useful for explaining a redirection to E-UTRAN (RAT and Band capability Indication) example in accordance with the exemplary embodiments of this invention.

An enhancement to deal with this case for multi-band UEs 10 is to indicate further information, in addition to a capability flag. FIG. 2 illustrates the case of redirection at call set-up from UTRAN to E-UTRAN, where additional band information is sent in accordance with exemplary embodiments of this invention.

Note that in FIG. 2 the initial conditions and operations are shown as being the same as those in FIG. 1, up to the UE 10 sending the RRC_CONNECTION_REQUEST message. In accordance with the exemplary embodiments of this invention, the RRC_CONNECTION_REQUEST message also includes a specific indication of those bands supported by the UE 10 that also appeared in the measurement control information (System Information) messages received from the NW 1. In this case these are UTRAN bands I and V, GERAN GSM 900, and E-UTRAN band I. In this manner the likelihood that the NW 1 will re-direct to the UE 10 to an unsupported band is greatly reduced, since the NW 1 is explicitly informed of the supported bands per RAT by the UE 10. Note that the RRC_CONNECTION_REQUEST made to the NW 1' (the E-UTRAN NW) may also include band-related information.

The use of this technique significantly reduces the need for the UE 10 to indicate its capabilities of each supported band for each supported RAT. In the example the UE only indicates the specific RATs and bands supported by the UE 10 that match with the RATs and the bands the NW 1 has indicated in the downlink messaging (system information and measurement control).

EXAMPLE 2

Inter-RAT Handover Information

For an inter-system HO from GERAN to UTRAN, it is necessary for the UE 10 to deliver the UTRAN capabilities to the NW 1 whilst still in the GSM system. As the UE 10 supports an increased number of bands for each RAT, the measurement capabilities for each RAT and bands supported result in additional information to be sent in a bandwidth and size-constrained uplink message(s). Due to these size restrictions it is possible for the capability information to be truncated in some situations.

A solution to this problem is to prioritize the order in which the bands supported and measurement capabilities within those bands are indicated within the UTRAN capabilities. These may be prioritized such that the bands for which there are valid neighbor cells (from GERAN downlink messaging) are listed first, and any other bands are listed subsequently or are omitted (i.e., those bands for which the UE 10 currently has no valid neighbor cell(s)). In this way the capabilities for the most important bands (those which are present at the current location of the UE 10) are successfully received by the NW 1 such that the UE 10 can be configured correctly after a successful handover to UTRAN.

Figure 3:
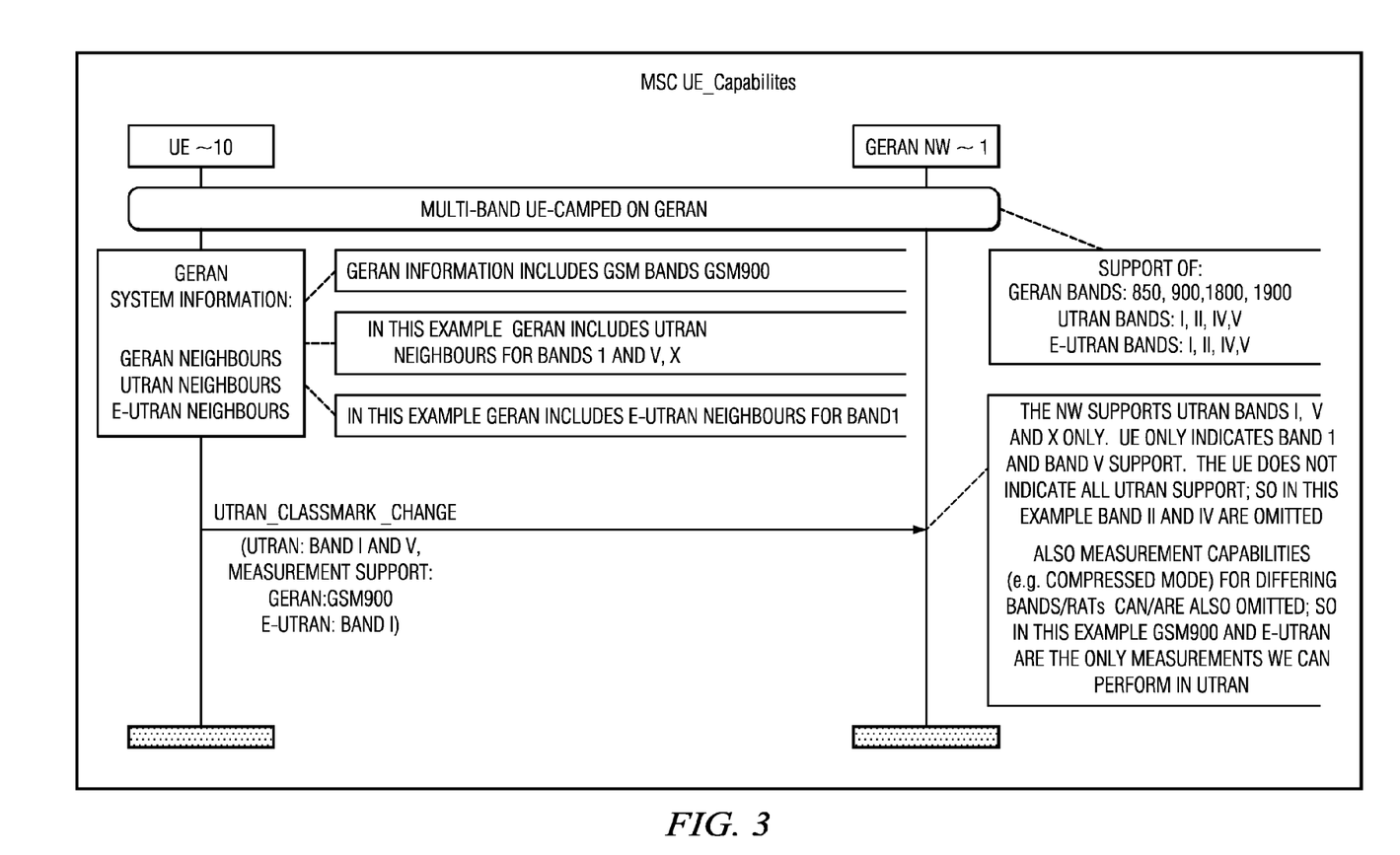
FIG. 3 is a message flow diagram that is useful for explaining an intersystem handover from GERAN to UTRAN example in accordance with the exemplary embodiments of this invention.

Referring to FIG. 3, in this example assume the case of a GERAN NW 1, and further assume the non-limiting case that the UE 10 is a multi-band UE that supports GERAN bands 850 MHz, 900 MHz, 1800 MHZ and 1900 MHz, UTRAN bands I, II, IV and V, and E-UTRAN bands I, II, IV and V. In this example GERAN system information includes GERAN neighbors for GSM 900 UTRAN neighbors for bands I, V and X, and E-UTRAN band I. The UE 10 sends a UTRAN_CLASSMARK_CHANGE message that includes UTRAN band I and V, followed by measurement support for GERAN GSM900 and E-UTRAN band I. As the UE 10 has only indicated band I and V support, the bands II and IV may not be used by the NW 1. Also, Measurement Capabilities (e.g., Compressed Mode) for differing bands/RATs can be/are omitted, so in this example GSM900 and E-UTRAN band I are the only measurements that can be performed in UTRAN.

Although the procedure depicted in FIG. 3 shows UTRAN capabilities being sent over GERAN, this concept is applicable to all mechanisms for delivering capabilities to the NW 1, e.g., it is also applicable to UTRAN capabilities being sent in UTRAN (and other cellular technologies).

In general, the examples depicted in FIGS. 1, 2 and 3 should not be viewed as limiting in any respect the use of these exemplary embodiments to only connection request and classmark change types of UL messaging.

Based on the foregoing it should be apparent that the exemplary embodiments of this invention provide a method, apparatus and computer program product(s) to improve communication between a wireless user communication terminal and a network.

More specifically, the exemplary embodiments of this invention provide an ability for the wireless user communication device to prioritize its capabilities that are indicated to the network based on the presence of other information provided by the network in the DL. For example, the UE 10 may use neighbor cell information provided by the network to prioritize mobility indications sent in the UL. This enables the UE to prioritize information about mobility to known neighbor cells (including differing RATs) over other supported capabilities, and hence the network is able to make better decisions about which procedures the UE 10 is capable of performing.

Figure 5:
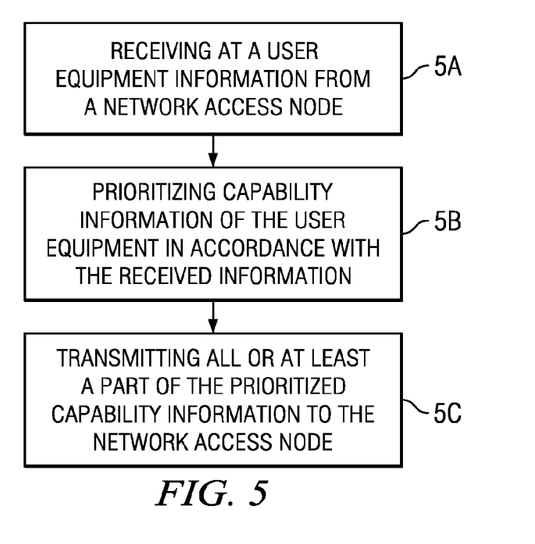
FIG. 5 is a logic flow diagram that illustrates the operation of a method, and a result of execution of computer program instructions, in accordance with the exemplary embodiments of this invention.

FIG. 5 is a logic flow diagram that illustrates the operation of a method, and a result of execution of computer program instructions, in accordance with the exemplary embodiments of this invention. At Block 5A a user equipment receives information from a network access node. At Block 5B the user equipment prioritizes its capability information in accordance with the received information, and at Block 5C transmits all or at least a part of the prioritized capability information to the network access node.

The method of the previous paragraph, where the information comprises neighbor cell information.

The method of the previous paragraphs, where the prioritized capability information comprises radio access technology capabilities and frequency bands supported within a given radio access technology.

The method of the previous paragraphs, where the capability information is transmitted as part of an uplink capability indication.

The method of the previous paragraphs, where the capability information is transmitted as part of a connection request.

The method of the previous paragraphs, where the capability information is transmitted as part of a classmark change.

The method of the previous paragraphs, where the capability information is transmitted to a first network as part of an original connection request using a first radio access technology, and is transmitted to a second network as part of a subsequent connection request using a second radio access technology after being redirected to the second radio access technology.

The various blocks shown in FIG. 5 may be viewed as method steps, and/or as operations that result from operation of computer program code, and/or as a plurality of coupled logic circuit elements constructed to carry out the associated function(s).

The exemplary embodiments of this invention also provide an apparatus that comprises part of user equipment having at least one wireless transceiver. The user equipment also includes a controller configured to receive information from a network access node via the transceiver, to prioritize capability information of the user equipment in accordance with the received information, and to transmit all or at least a part of the prioritized capability information to the network access node via the transceiver.

The apparatus of the previous paragraph, where the information comprises neighbor cell information.

The apparatus of the previous paragraphs, where the prioritized capability information comprises radio access technology capabilities and frequency bands supported within a given radio access technology.

The apparatus of the previous paragraphs, where the capability information is transmitted as part of an uplink capability indication.

The apparatus of the previous paragraphs, where the capability information is transmitted as part of a connection request.

The apparatus of the previous paragraphs, where the capability information is transmitted as part of a classmark change.

The apparatus of the previous paragraphs, where the capability information is transmitted to a first network as part of an original connection request using a first radio access technology, and is transmitted to a second network as part of a subsequent connection request using a second radio access technology after being redirected to the second radio access technology.

Figure 6:
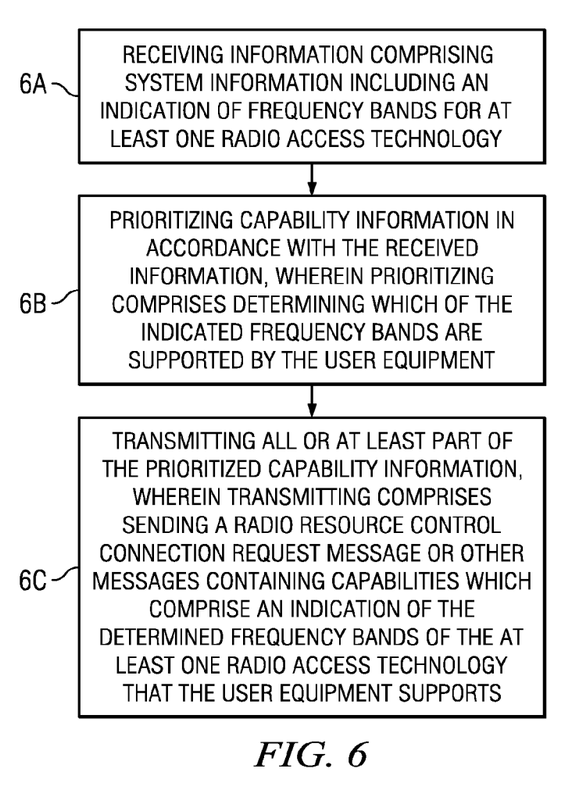
FIG. 6 is a logic flow diagram that illustrates another operation, and a result of execution of computer program instructions, in accordance with the exemplary embodiments of this invention.
Figure 7:
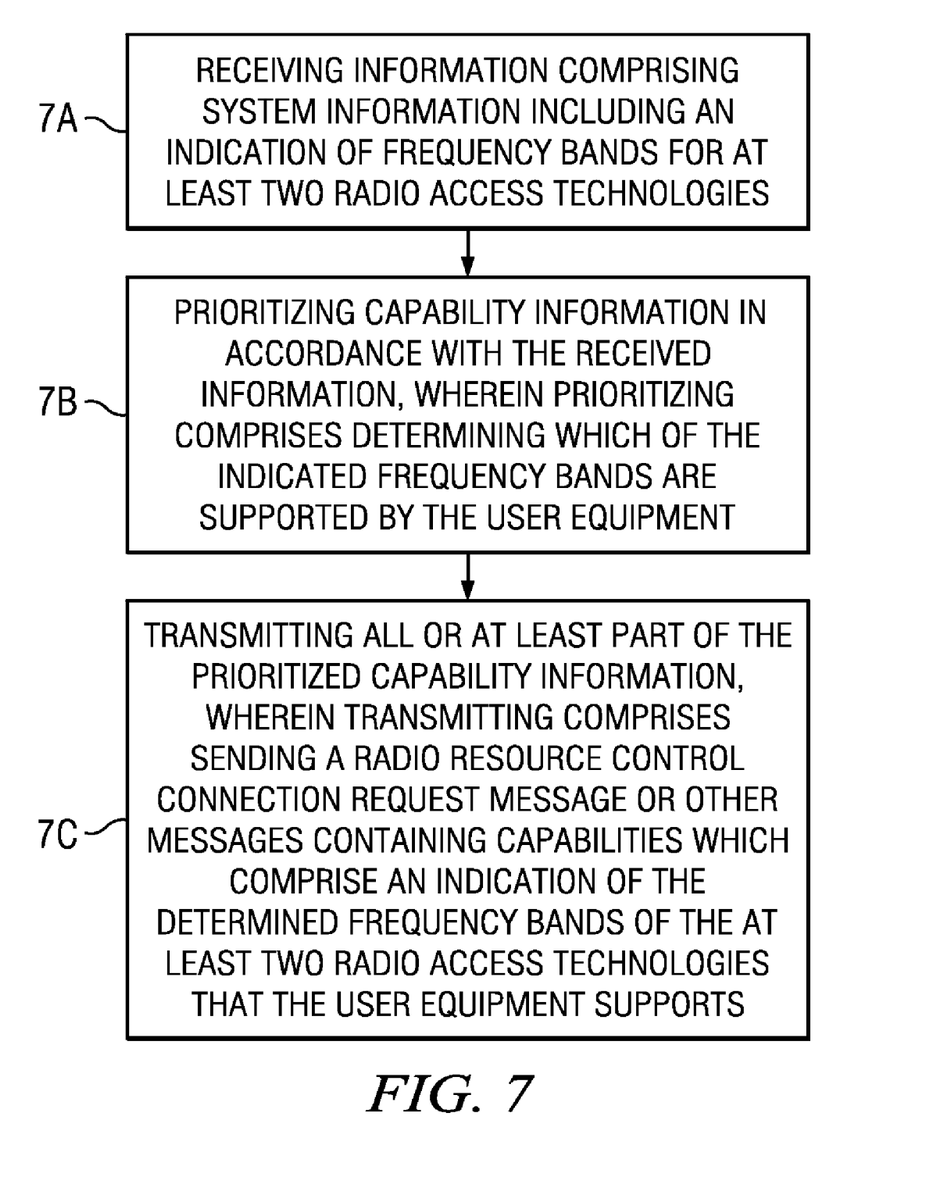
FIG. 7 is a logic flow diagram that illustrates another operation, and a result of execution of computer program instructions, in accordance with the exemplary embodiments of this invention.

FIGS. 6 and 7 are logic flow diagrams that illustrate operations of at a method and apparatus, and a result of execution of computer program instructions, in accordance with the exemplary embodiments of this invention.

In FIG. 6, at Block 6A there is receiving information, such as at a user equipment, comprising system information including an indication of frequency bands for at least one radio access technologies. At Block 6B there is prioritizing, by the user equipment, capability information in accordance with the received information, wherein prioritizing comprises determining which of the indicated frequency bands are supported by the user equipment, and at Block 6C there is transmitting, by the user equipment, all or at least part of the prioritized capability information, wherein transmitting comprises sending a radio resource control connection request message which comprises an indication of the determined frequency bands of the at least one radio access technology that the user equipment supports.

The method and apparatus of the previous paragraph, wherein the indication of the determined frequency bands comprises at least one flag indicating whether the user equipment supports the at least one radio access technology in a frequency division duplex mode.

The method and apparatus of any of the previous paragraphs, wherein the indication of the determined frequency bands comprises at least one flag indicating whether the user equipment supports the at least one radio access technology in a time division duplex mode.

In FIG. 7, at Block 7A there is receiving information, such as at a user equipment, comprising system information including an indication of frequency bands for at least two radio access technologies. At Block 7B there is prioritizing, by the user equipment, capability information in accordance with the received information, wherein prioritizing comprises determining which of the indicated frequency bands are supported by the user equipment, and at Block 7C there is transmitting, by the user equipment, all or at least part of the prioritized capability information, wherein transmitting comprises sending a radio resource control connection request message which comprises an indication of the determined frequency bands of the at least two radio access technologies that the user equipment supports.

The method and apparatus of the previous paragraph, wherein the information is received in a first radio access technology and where the indication of the determined frequency bands is for the first radio access technology and at least one other radio access technology.

The method and apparatus of the previous paragraphs, wherein the indication of the determined frequency bands comprises at least one flag indicating whether the user equipment supports the at least two radio access technologies in a frequency division duplex mode.

The method and apparatus of the previous paragraph, wherein the at least one a flag indicates whether the user equipment supports multiple frequency bands in the frequency division duplex mode.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. It should thus be appreciated that the exemplary embodiments of this invention may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of, for example, the E-UTRAN (UTRAN-LTE), UTRAN, GERAN, and GSM systems, it should be appreciated that the exemplary embodiments of this invention are not limited for use with only these particular types of wireless communication system and radio access technologies, and that they may be used to advantage with other wireless communication systems and radio access technologies.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters, systems, frequency bands and message types (e.g., RRC_CONNECTION_REQUEST) are not intended to be limiting in any respect, as these various parameters, systems, frequency bands and message types may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:
1. A method comprising:
receiving at a user equipment information from a network access node;
prioritizing capability information of the user equipment in accordance with the received information; and
transmitting all or at least part of the prioritized capability information to the network access node, wherein receiving comprises receiving system information including an indication of frequency bands for at least two radio access technologies, wherein prioritizing comprises determining which of the indicated frequency bands are supported by the user equipment, and wherein transmitting comprises sending a radio resource control connection request message containing the capability information that comprises an indication of the determined frequency bands of at least one of the at least two radio access technologies that the user equipment supports, wherein the indication of the determined frequency bands comprises at least one flag indicating whether the user equipment supports at least one of the at least two radio access technologies in a frequency division duplex mode.

2. The method according to claim 1, wherein the information is received in a first radio access technology and where the indication of the determined frequency bands is for the first radio access technology and at least one other radio access technology.

3. A non-transitory computer readable medium encoded with a computer program executable by a processor to cause an apparatus to perform actions comprising: receiving at the apparatus information from a network access node; prioritizing capability information of the apparatus in accordance with the received information; and transmitting all or at least part of the prioritized capability information to the network access node, wherein the receiving comprises receiving system information including an indication of frequency bands for at least two radio access technologies, wherein prioritizing comprises determining which of the indicated frequency bands are supported by the apparatus, and wherein transmitting comprises sending a radio resource control connection request message containing the capability information that comprises an indication of the determined frequency bands of at least one of the at least two radio access technologies that the apparatus supports, wherein the indication of the determined frequency bands comprises at least one flag indicating whether the apparatus supports at least one of the at least two radio access technologies in a frequency division duplex mode.

4. The non-transitory computer readable medium encoded with a computer program executable by a processor according to claim 3, wherein the indication of the determined frequency bands comprises at least one flag indicating whether the apparatus supports at least one of the at least two radio access technologies in a time division duplex mode.

5. The non-transitory computer readable medium encoded with a computer program executable by a processor according to claim 3, wherein the information is received in a first radio access technology and where the indication of the determined frequency bands is for the first radio access technology and at least one other radio access technology.

6. An apparatus comprising:
at least one processor and
at least one memory including computer program code; the at least one memory and the computer program code configured, with the at least one processor, to cause the apparatus, in response to receiving information from a network access node, at least to:
prioritize capability information of the apparatus in accordance with the received information; and
transmit all or at least a part of the prioritized capability information to the network access node, wherein the receiving comprises receiving system information including an indication of frequency bands for at least two radio access technologies, wherein prioritizing comprises determining which of the indicated frequency bands are supported by the apparatus, and wherein transmitting comprises sending a radio resource control connection request message containing the capability information that comprises an indication of the determined frequency bands of at least one of the at least two radio access technologies that the apparatus supports, wherein the indication of the determined frequency bands comprises at least one flag indicating whether the apparatus supports at least one of the at least two radio access technologies in a frequency division duplex mode.

7. The apparatus according to claim 6, where the information is received in a first radio access technology and wherein the indication of the determined frequency bands is for the first radio access technology and at least on other radio access technology.

8. The method of claim 1, wherein in case said indication of frequency bands supported by the user equipment for a radio access technology does not include one or more available frequency bands or in case said indication of supported radio access technologies does not include one or more available radio access technologies, the network access node is able to redirect and establish a connection to a frequency or radio access technology included in said indication of frequency bands supported by the user equipment and to avoid redirection and failure to establish a connection on a frequency or to a radio access technology not included in said indication.

9. The computer-readable medium of claim 3, wherein in case said indication of frequency bands supported by the apparatus for a radio access technology does not include one or more available frequency bands or in case said indication of supported radio access technologies does not include one or more available radio access technologies, the network access node is able to redirect and establish a connection to a frequency or radio access technology included in said indication of frequency bands supported by the apparatus and to avoid redirection and failure to establish a connection on a frequency or to a radio access technology not included in said indication.

10. The apparatus of claim 6, wherein in case said indication of frequency bands supported by the apparatus for a radio access technology does not include one or more available frequency bands or in case said indication of supported radio access technologies does not include one or more available radio access technologies, the network access node is able to redirect and establish a connection to a frequency or radio access technology included in said indication of frequency bands supported by the apparatus and to avoid redirection and failure to establish a connection on a frequency or to a radio access technology not included in said indication.

* * * * *